March 17, 1925.
E. A. RASBRIDGE
BEARING
Filed Nov. 28, 1923
1,530,090
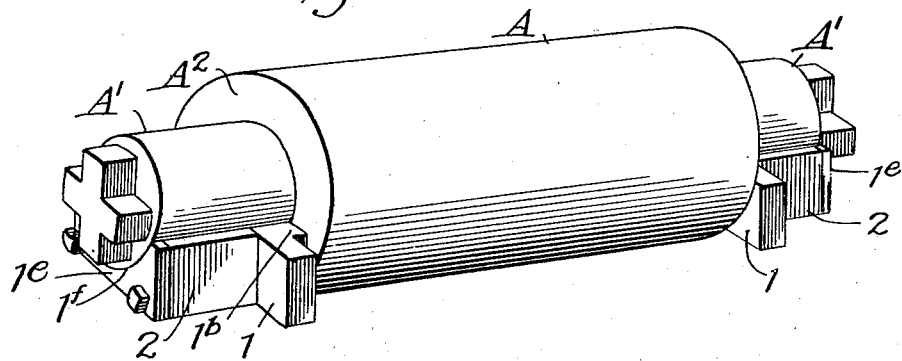
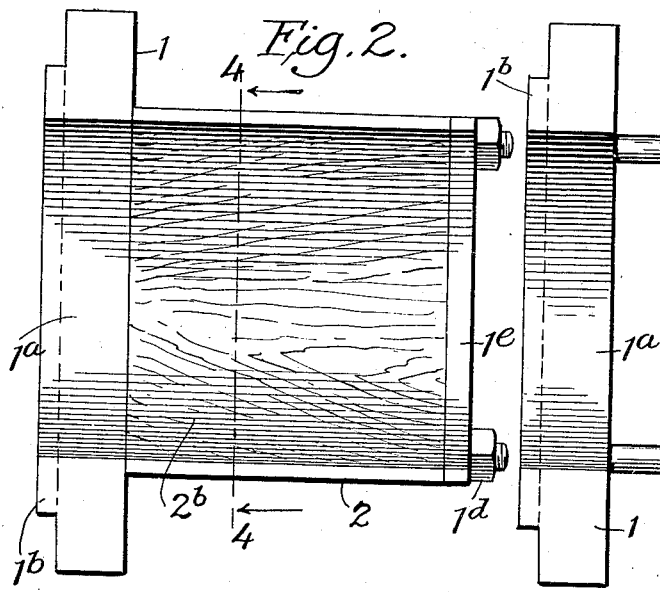
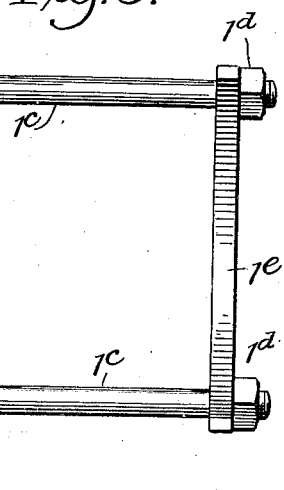
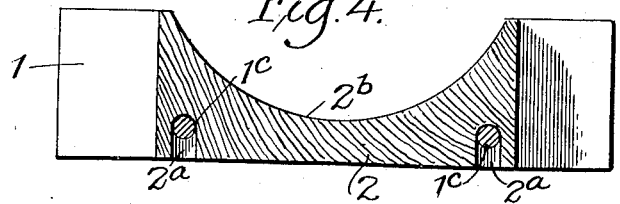
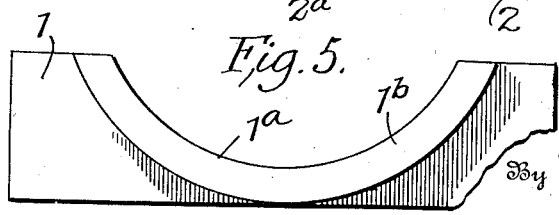
Inventor
Edward A. Rasbridge
By Alexander & Dowell
Attorneys Patented Mar. 17, 1925.

1,530,090

UNITED STATES PATENT OFFICE.

EDWARD ASA RASBRIDGE, OF LEBANON, PENNSYLVANIA.

BEARING.

Application filed November 28, 1923. Serial No. 677,482.

*To all whom it may concern:*

Be it known that I, EDWARD A. RASBRIDGE, a citizen of the United States, residing at Lebanon, in the county of Lebanon and State of Pennsylvania, have invented certain new and useful Improvements in Bearings; and I hereby declare that the following is a full, clear, and exact description thereof, reference being had to the accompanying drawings, which form part of this specification.

This invention is an improvement in bearings for rolling-mills and the like, and the object thereof is to provide a novel, durable, inexpensive, and efficient bearing to be used under the necks of the rolls of such rolling mills, said bearing being adapted to be used in place of the all-brass bearings now commonly in use, which bearings are expensive on account of the large amount of brass contained therein. Furthermore by using the all-brass bearings, as heretofore used, under the necks of the rolls, the bearing has a tendency to wear out the roll neck, and the use of such bearings necessities a large quantity of grease or suet for lubrication thereof. But by using my novel bearing, the quantity of grease or suet necessary for proper lubrication of the bearing will be greatly reduced, and my bearing bushing will prevent the necks of the rolls from rapidly wearing out. Furthermore, the quantity of brass used in my bearing will be greatly reduced, but my bearing is equally as durable as the all-brass bearing, and can be manufactured at half the cost.

I will explain the invention with reference to the accompanying drawing which illustrates one practicable embodiment thereof to enable others to adopt and use the same, and will summarize in the claims the novel features of construction, and novel combinations of parts, for which protection is desired.

In the drawings:

Fig. 1 is a perspective view of a roll showing my novel bearing applied to the neck thereof.

Fig. 2 is a top plan view of my novel bearing, detached.

Fig. 3 is a top plan view of my novel bearing, with the hardwood bushing removed.

Fig. 4 is a section on the line 4—4, Fig. 2.

Fig. 5 is a front elevation of the bearing showing the arcuate thrust projection.

As shown in the drawings, my novel bearing is adapted to be used under the reduced neck $A'$ at each end of a roll A for rolling mills, the connection between the reduced neck $A'$ and the body of the roll A forming a shoulder $A^2$, which is preferably disposed at right angles to the axis of the roll A.

The bearings may be inserted in the frame work, or other part, of the rolling mill in any desired manner. As shown, each bearing comprises a base 1, preferably made of solid brass, which base is preferably substantially rectangular in form and of suitable desired dimensions, the length thereof being preferably greater than the diameter of the roll neck $A'$. In the top face of the body 1 is a parti-cylindrical recess $1^a$ of radius equal to the radius of the roll neck $A'$, and the depth of said recess is preferably approximately equal to half the radius of its curvature. On the front face of the member 1 is provided an arcuate projection, flange, or lug $1^b$, of suitable dimensions, the interior radius thereof being equal to the radius of curvature of the recess $1^a$, thereby forming a greater bearing surface for the roll neck $A'$, and part $1^b$, as shown in Fig. 1, forms a thrust bearing adapted to bear against the shoulder $A^2$ of the roll A, to prevent displacement of the roll, and to keep the roll from shifting axially in the bearings. Lug $1^b$ is preferably formed integral with the base 1, and is also preferably made of brass, on account of the great strain and contact pressure of the roll against said lug.

From the opposite face of the base 1, adjacent the lower edge thereof extend rods $1^c$ of equal length, which rods are threaded on their outer ends, and adapted to receive nuts $1^d$, for fastening a backing plate $1^e$ thereon, said plate $1^e$ being provided with suitable perforations for the passage therethrough of the rods $1^c$, and the upper face of said plate $1^e$ being recessed, as at $1^f$, to correspond with the curvature of the recess $1^a$, and of the roll neck $A'$.

Between plate $1^e$ and the member 1, is inserted a block 2 of hard wood, provided with grooves $2^a$ in its bottom face, adapted to receive the rods $1^c$ (as shown in Fig. 4) upon which the block 2 rests, and said grooves $2^a$ being adapted to prevent lateral movement of the block 2 with respect to the members 1 and $1^e$. The upper face of block 2, is likewise provided with parti-cylindrical recess 2ᵇ, coaxial with, and of same radius as, the recesses 1ᵃ and 1ᶠ in members 1 and 1ᵉ, recess 2ᵇ being a continuation thereof.

The roll neck A' is adapted to rest in the coaxial recesses 1ᵃ, 2ᵇ and 1ᶠ, in the parts of the bearing, with shoulder A² of the roll contacting with the front face of part 1ᵇ of member 1. In actual use, the roll neck A' will bear upon the two brass members 1 and 1ᵉ with the same pressure as it bears upon the hardwood block 2, thus making it impossible for the wood block to wear out before the brass members are worn out.

My novel bearing is as durable as an all-brass bearing; it can be constructed at about half the cost as an all-brass bearing; the use of my bearing will reduce the amount of lubricating grease required for proper lubrication of the all-brass bearing; and the wood bushing 2 will prevent the roll neck from wearing-out with undue rapidity, thereby producing longer serviceability of the rolls than can be obtained when all-brass bearings are used in connection therewith.

I claim:

1. A bearing comprising a base; rods extending therefrom; a backing plate adjustably mounted on said rods; and a removable bushing resting on said rods and interposed between said base and backing strip; said bearing having a parti-cylindrical recess in one face.

2. A bearing comprising a base; a pair of parallel rods extending therefrom; a backing plate adjustably mounted on said rods; a removable bushing interposed between said base and backing plate; and means for preventing lateral movement of said bushing; said bearing having a parti-cylindrical recess in one face parallel with said rods.

3. A bearing comprising a metallic base; a pair of parallel rods extending from one face thereof; a metallic backing plate adjustably mounted on said rods; a solid hardwood bushing resting on said rods and interposed between said base and backing plate; and means for preventing lateral movement of said bushing; said bearing having a parti-cylindrical recess extending longitudinally in one face parallel with said rods.

4. A bearing comprising a metallic base; a plurality of rods extending from one face of said base; a metallic backing plate adjustably mounted on said rods; a hardwood bushing interposed between said base and backing plate; said bushing resting on said rods and having grooves in its bottom face for the reception of said rods; and a parti-cylindrical recess extending through one face of the bearing on the longitudinal axis thereof.

5. A bearing comprising a metallic base; a plurality of spaced rods extending from one face of said base; a metallic backing plate adjustably mounted on said rods; a hardwood bushing interposed between said base and backing plate, said bushing resting on said rods, and having grooves in its bottom face for the reception of said rods; means coacting with said rods for binding said bushing between said base and backing plate; a parti-cylindrical recess extending through one face of the bearing on the longitudinal axis thereof; and an arcuate thrust projection on the front face of said base coaxial with the said recess in its upper face, the interior radius of said arcuate projection being equal to the radius of said recess.

6. A bearing for the rolls of rolling mills, comprising a substantially rectangular metallic base having a parti-cylindrical recess in one face adapted to receive the neck of said roll; an arcuate thrust projection on the front face of the base concentric with the recess in its upper face, the interior radius of said arcuate projection being equal to the radius of said recess and said arcuate projection being adapted to engage the shoulder at the neck of said roll; a plurality of spaced rods extending from the rear face of said base; a brass backing plate adjustably mounted on the outer ends of said rods; a hardwood bushing adapted to be inserted between said base and backing plate and resting on said rods, said bushing being provided with grooves on its bottom face adapted to receive said rods; said bushing and backing plate being provided with parti-cyclindrical recesses co-axial with, and of the same radius as, the recess in the base, and means coacting with said rods for binding the bushing between the base and the backing plate.

In testimony that I claim the foregoing as my own I affix my signature.

EDWARD ASA RASBRIDGE.